United States Patent [19]

Schrenk

[11] Patent Number: 5,014,311
[45] Date of Patent: May 7, 1991

[54] INTEGRATED CIRCUIT WITH AN ACCESS-CONTROLLED DATA MEMORY

[75] Inventor: Hartmut Schrenk, Haar, Fed. Rep. of Germany

[73] Assignee: Siemens Aktiengesellschaft, Berlin and Munich, Fed. Rep. of Germany

[21] Appl. No.: 412,601

[22] Filed: Sep. 26, 1989

Related U.S. Application Data

[63] Continuation of Ser. No. 881,078, July 2, 1986, abandoned.

[30] Foreign Application Priority Data

Jul. 3, 1985 [DE] Fed. Rep. of Germany ....... 3523842

[51] Int. Cl.$^5$ ............................................ G06F 12/14
[52] U.S. Cl. .......................................... 380/23; 380/4; 380/24; 380/50; 235/379; 235/380; 235/382; 340/825.31; 340/825.34
[58] Field of Search ............... 340/825.31, 825.34; 380/3, 4, 23–25, 49–50; 235/382, 379, 380; 307/202.1; 364/222.5, 238.4, 238.6–238.9, 239, 239.1–239.9, 242.91, 246.6–246.9, 246.92, 265.3, 286.4, 286.5, 918.7, 926.1–926.6, 924.9, 924.92, 957.7, 958.4, 963, 963.1–963.5, 965.8, 968, 969, 969.1–969.4, 971, 971.1, 200 MS File, 900 MS File

[56] References Cited

U.S. PATENT DOCUMENTS

| 3,906,460 | 9/1975 | Halpern | 178/22.08 |
| 4,408,119 | 10/1983 | Decavele | 235/382 |
| 4,421,977 | 12/1983 | Kittredge | 364/900 |
| 4,484,067 | 11/1984 | Obrecht | 235/382 |
| 4,525,599 | 6/1985 | Curran et al. | 178/22.08 |
| 4,593,384 | 6/1986 | Kleijne | 307/202.1 |
| 4,716,586 | 12/1987 | Bauer | 380/3 |

Primary Examiner—Stephen C. Buczinski
Assistant Examiner—Bernarr Earl Gregory
Attorney, Agent, or Firm—Herbert L. Lerner; Laurence A. Greenberg

[57] ABSTRACT

A method for protecting secret code data stored in a data memory from analysis includes forming conclusions as to the content of the memory from signals at outputs of the memory, and limiting transfer of the code data from the data memory into a peripheral logic to a predetermined time period and an apparatus for carrying out the method.

19 Claims, 2 Drawing Sheets

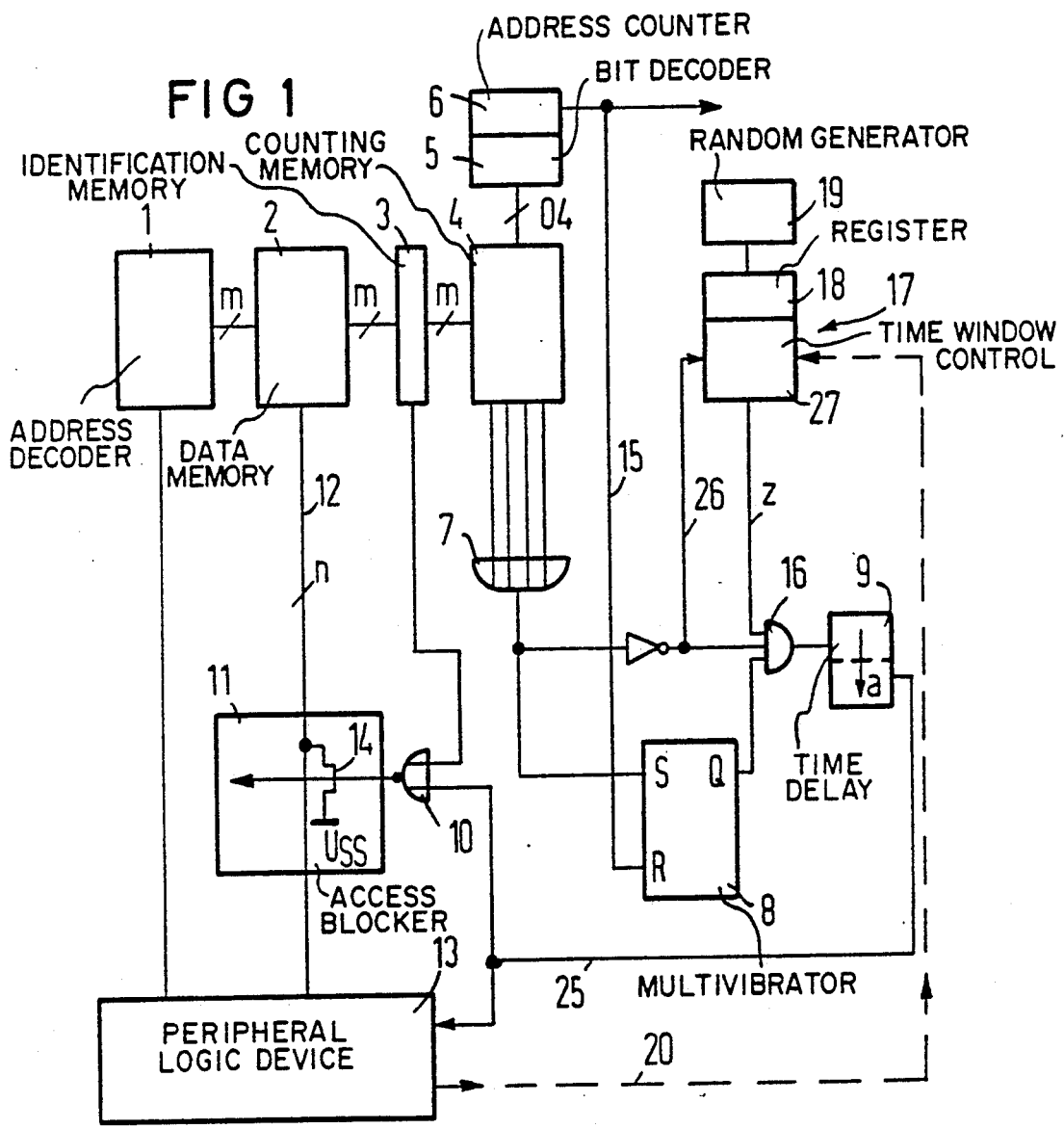

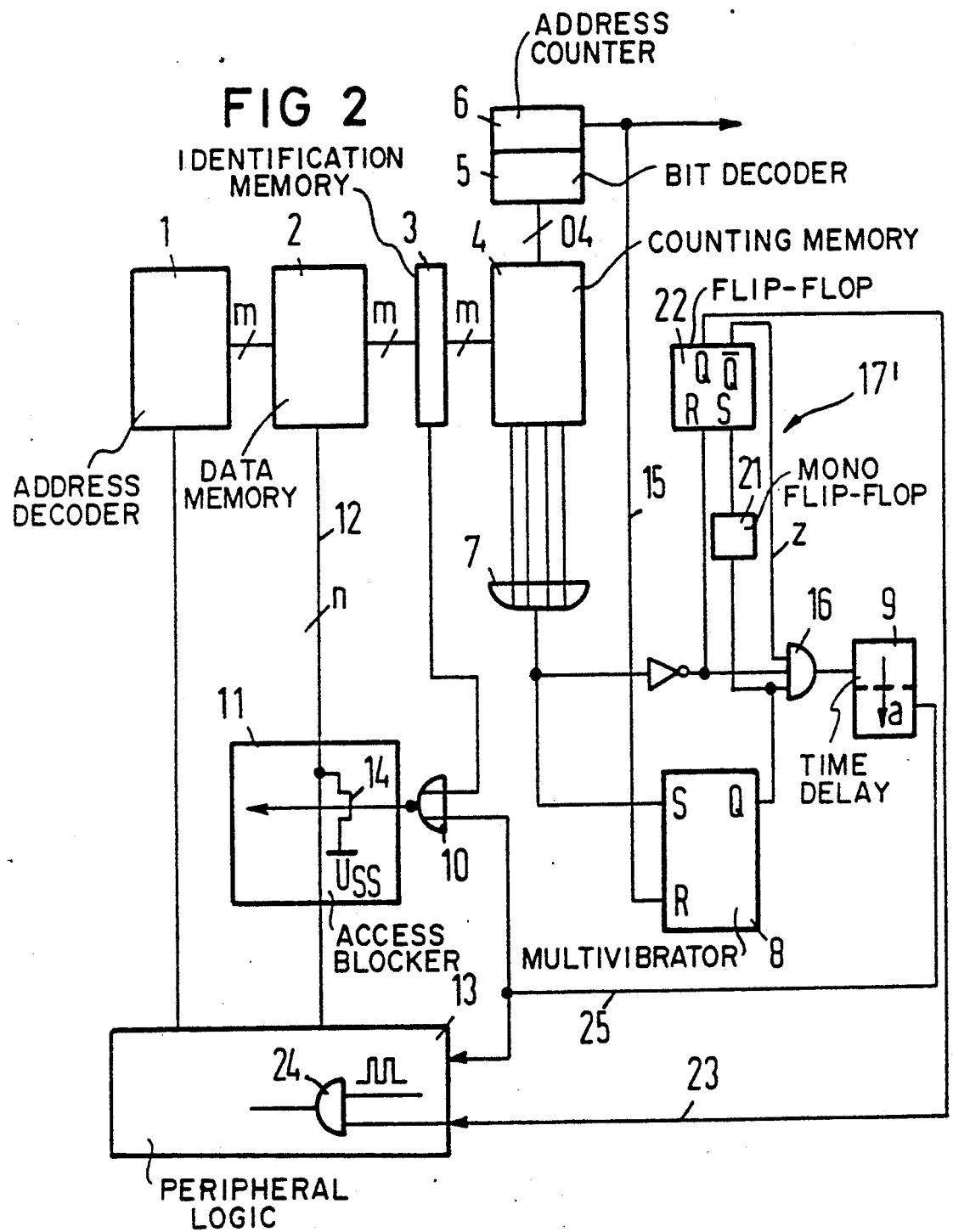

INTEGRATED CIRCUIT WITH AN ACCESS-CONTROLLED DATA MEMORY

This application is a continuation of application Ser. No. 881,078, filed July 2, 1986, now abandoned.

The invention relates to a method for protecting secret code data stored in a data memory from analysis, in which conclusions as to the content of the memory can be drawn from signals at outputs of the memory, and an integrated circuit with a data memory for carrying out the method.

Such an integrated circuit is an essential element of a so-called chip card which can be used in security and access systems, in accounting and recording systems and in debit and credit systems. Access to the integrated circuit and the data memory is provided through external electrical contacts on the surface of the card in a card reader.

In many applications, memory data are stored on the cards and are used as a secret code for the identification or authentication of the card user or the card. The security of the system depends on how well these data are protected against unauthorized analysis. Therefore, the security of the cards and the readers against fraud must meet very stringent requirements. Due to the security provisions available corresponding to the present state of the art, a direct attempt to analyze the content of the data memory, which as a rule is formed of an $E^2$-PROM memory, is hardly promising. However, it could be attempted to draw conclusions as to these memory data from the direct influence of the memory data on the memory outputs or the peripheral logic device connected thereto.

It is accordingly an object of the invention to provide an integrated circuit and a method for protecting secret code data stored in a data memory from analysis, which overcomes the hereinafore-mentioned disadvantages of the heretofore-known methods and devices of this general type and for preventing conclusions regarding the memory content from being drawn from the indirect influence of the memory data on a peripheral logic device.

With the foregoing and other objects in view there is provided, in accordance with the invention, a method for protecting secret code data stored in a data memory from analysis, which comprises forming conclusions as to the content of the memory from signals at outputs of the memory, and limiting transfer of the code data from the data memory into a peripheral logic device to a predetermined time period.

In accordance with another mode of the invention, the method comprises initiating a start of the time period by writing a storage cell in a counting memory.

In accordance with an additional mode of the invention, the method comprises starting a monostable multivibrator at the start of the time period, the monostable multivibrator having a pulse with a trailing edge which determines the end of the time period.

In accordance with an added mode of the invention, the method comprises addressing a counting memory registering the addressing with every data address of the data memory.

In accordance with a further mode of the invention, the method comprises switching output lines of the data memory to a fixed potential independently of the data memory, for blocking the data transfer from the data memory to the peripheral logic device.

In accordance with again another mode of the invention, the method comprises designating a writing state of the counting memory as a discharge state of the corresponding storage cells.

In accordance with again an added mode of the invention, the method comprises jointly addressing an identification memory with the data memory and the counting memory, and blocking the data transfer from the data memory to the peripheral logic device in dependence on the storage information in the identification memory.

In accordance with again an additional mode of the invention, the method comprises adjusting the time period so that only a single data comparison can be made.

In accordance with again a further mode of the invention, the method comprises determining the start of the time period with a control which is internal to a chip and cannot be recognized from the outside.

In accordance with still another mode of the invention, the method comprises adjusting the start of the time period in dependence on a writing period with a random generator.

In accordance with still an added mode of the invention, the method comprises adjusting the start of the time period in dependence on a writing period of a storage cell of a counting memory.

In order to carry out the method, there is provided an integrated circuit for protecting secret code data from analysis, comprising a data memory storing the secret code data and having outputs, a blocking device connected to the outputs of the data memory, a time delay stage for determining a time window, the time delay stage being connected to the blocking device for addressing the blocking device and being connected to the data memory for triggering the delay stage, at least indirectly, with an address signal of the data memory, a peripheral logic device connected to the blocking device, and a predetermined potential source, the blocking device including means for releasing the outputs of the data memory to the peripheral logic device within the time window and for connecting the outputs of the data memory to the predetermined potential source independently of the content of the data memory outside the time window.

In accordance with another feature of the invention, the time delay stage is a monostable multivibrator.

In accordance with an additional feature of the invention, the releasing and connecting means are in the form of transistors having controllable paths each being connected to a respective one of the memory outputs to be protected and to the predetermined potential source.

In accordance with an added feature of the invention, there is provided a counting memory connected parallel to the data memory for registering the number of addressings of the data memory, and a logic member connected between the counting memory and the time delay stage for indicating a counter overflow.

In accordance with a further feature of the invention, there is provided an address counter connected to the counting memory.

In accordance with yet another feature of the invention, there is provided a multivibrator having a setting input at least indirectly connected to the counting memory, a resetting input connected to the address counter and an output connected to the counting stage.

In accordance with yet an additional feature of the invention, there is provided an identification memory connected parallel to the data memory and having an output connected to the blocking device for activating and deactivating the blocking device.

In accordance with yet a further feature of the invention, there is provided an internal time window control connected to an input of the time delay stage.

In accordance with a concomitant feature of the invention, the time window control is a random generator.

The invention is based on permitting the outputs of the memory cells, which as a rule are the column lines of the memory panel, to be cut off from the peripheral logic device in the normal state. The cut-off is only cancelled for a brief instant, during which the secret data are actually required for the data comparison in the peripheral logic device. The time period during which an analysis could be performed, is therefore limited to a short time span of a few microseconds, for instance.

Preferably, the output lines to be protected are connected to a defined potential and are independent of the stored information. The security of the circuit can be additionally increased, according to a further embodiment of the invention, by fixing the start of the access time so that it cannot be recognized from the outside. Thus, it is almost impossible to utilize the short access time. A preferred measure for this purpose is to fix the start with a random generator internal to the chip, which permits the statistical variation of the starting time in conjunction with the counting device.

In order to further limit the number of possible attempts to an analysis, the start of a memory access is initiated by a writing operation in a counting memory which is jointly addressed with the respective code word. Each access uses up one bit of the counting memory. The number of these counting bits determines the number of permissible attempts. The counting memory therefore assumes the role of an associated counter specific to the code which, if it runs over, not only blocks the card but also simultaneously cancels any possibility of an analysis.

After the completion of the writing operation in the counting memory, not only is the access blockage to the secret data cancelled, but at the same time a time delay stage is triggered which is preferably formed of a monostable flip-flop, the trailing edge of which signals the end of the time interval available for the code comparison. In order to prevent a fraudulent manipulation of fully written cell memories, it is advisable, according to the invention, to have the written state correspond to the neutral state of the memory. In order to limit the access blockage to only those memory addresses which actually contain secret code data, a further memory can be provided according to the invention as an identification memory.

Other features which are considered as characteristic for the invention are set forth in the appended claims.

Although the invention is illustrated and described herein as embodied in an integrated circuit with an access-controlled data memory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 1 and 2 are schematic circuit diagrams showing different embodiments of the invention:

Referring now to the figures of the drawings in detail and first, particularly, to FIG. 1 thereof, there is seen an integrated circuit comprising an address decoder 1, a data memory 2, an identification memory 3 and a counting memory 4.

All of the memories can be addressed in parallel by the address decoder 1 through m addressing lines. An address counter 6 is furthermore connected through a bit decoder 5 to the counting memory 4 over a line 04. The output of the counting memory 4 is connected through an OR stage 7 to a multivibrator 8 and a time delay stage 9. The outputs of the identification memory 3 and the time delay stage 9 are connected through a NOR stage 10 to the control input of an access blocker or blocking device 11 which is connected into data output or column lines 12 of the memory 2. In order to simplify the presentation, only one of n column lines of the data memory 2 and the corresponding blocking device are shown in the figure. Reference numeral 13 designates a peripheral logic device with memory addressing and comparison logic, the construction and operation of which are generally known.

An address or storage location of the identification memory 3 and the counting memory 4 is permanently associated with each address of the data memory 2. The identification memory 3 determines whether the corresponding data in the memory 2 are secured or unsecured. In the illustrated embodiment in which the identification memory 3 is one bit wide, an output voltage of a logical 1 means that the corresponding memory area is not secured. An output voltage of logical 0 characterizes a secured memory area of the data memory 2 in which code data which are to be kept secret, are stored.

The word width of the non-volatile $E^2$-PROM counting memory 4 determines the number of permissible accesses or access attempts to the memory 2. In the illustrated embodiment, each memory location which can be addressed under one address is four bits wide. Each memory access uses up one bit of the counting memory 4. The written counter bits can only be erased again if a correct data comparison is carried out in an access and a release is therefore achieved. When the memory overflows (after four access attempts in the illustrated embodiment), the corresponding memory location in the data memory 2 is blocked. At the same time, any possibility of an analysis is cancelled, which can be further seen from the following description.

The bits to be written into the counting memory 4 are derived from the address counter 6 through the bit decoder 5.

In order to provide a secure starting state for the apparatus, the neutral counting memory, i.e., the counting memory on which no write operations have yet been performed, causes the blockage of the blocking device 11. In the illustrated embodiment, this neutral state is characterized by a logical 0 content. The combination 0-0-1-1 means, for instance, that two access attempts were undertaken on the corresponding memory location of the data memory 2. If, for instance, the memory content is 0-0-0-0, four accesses to the corresponding code have already been made. Since the counter memory is thus written full, it is no longer possible to trigger the time delay stage 9.

The operation of the apparatus is described below under the assumption that the address addressed in the data memory 2 contains secret code information which is to be protected. The desired address arrives at the address decoder 1 from the peripheral logic device 13 with memory control, through which the corresponding memory location in the data memory 2, in the identification memory 3 and in the counting memory 4 are simultaneously addressed. Since it is assumed that secret data are involved, the respective memory location in the identification memory 3 is marked as a logical 0. This level is present at the input of the NOR stage or gate 10, so that its output signal depends on the signal level at its second input and it conducts in the rest condition. The blockage is therefore operative.

The blocking device 11 includes a transistor 14 for each column line 12, the controlled path of which connects the column line to a predetermined potential $U_{SS}$. If the transistor 14 is conducting, the blockage is operative. If, on the other hand, the transistor 14 is cut off, the corresponding column line 12 is released.

In order to cancel the blockage for a code data address, a "free", i.e. a still erased bit must be addressed in the counting memory 4. This is registered through the OR stage or gate 7 by setting the multivibrator 8 which is formed of an RS flip-flop in this case, at a setting input S..

The time delay stage 9 is triggered by a signal Z if the multivibrator 8 has been set by addressing a free bit (logical 1) in the counting memory 4, since this bit was written subsequently according to a logical 0. In the case of a prohibited change of the address counter bit, the multivibrator stage 8 is immediately reset at a resetting input R by the output of the address counter 6 through a line 15. Due to the logical interconnection of the output signal from an output Q of the multivibrator stage 8 with the negated output signal of the OR stage 7 and the signal Z in an AND stage 16 having an output which triggers the time delay stage 9, the time delay stage 9 is thereupon reset immediately to a secure state, in which the blocking device 11 is blocked by the NOR stage 10.

In the other case, the time delay stage 9 releases the column lines 12 during the predetermined switching phase through the NOR stage 10 and the transistors 14.

The time delay stage 9 is therefore triggered indirectly through the counting memory 4 and the components connected thereto through an addressing signal of the data memory 3, if the above-described conditions are met within the time window determined by the time delay stage 9: the memory outputs are then released, while they are at the predetermined potential outside the time window, independently of the content of the data memory 2.

In the illustrated embodiment, the time delay stage 9 is formed of a monostable multivibrator, the trailing edge of the signal of which determines the end of the time period within which the outputs of the data memory 2 are released. This time period is no longer than is necessary for a single data comparison. In other words, the time constant of the time delay stage for determining the time window is just large enough so that the code word stored in the memory location can be compared with reference data through the peripheral and comparator logic device 13. If a chip card is used, the reference data can be a personal identification number of the card holder or the like.

Reference numeral 17 designates an internal time window control which determines the start of the evaluation period. Due to the presence of the AND stage 16, the time delay stage 9 can only be triggered when the output signal Z of the time window control 17 assumes a logical 1 level. The generation of the signal Z can be carried out in a simple manner, such as if the time window control is formed of a random generator. The time window control is synchronized by the peripheral and comparator logic device 13 with the time cycle of the data comparison operation. This synchronization is accomplished by a trigger signal on a line 20 which is a broken line in order to distinguish from the embodiment explained below.

In an alternative embodiment, the trigger pulse for the time window control 17 is derived over a line 26 from the output signal of the OR stage 7.

In both cases, the time window control 17 operates as follows: A random generator 19 deposits a counter setting in a register 18. After a trigger pulse arrives (either by way of the line 26 or the line 20), a counter 27 starts and is incremented until its counter reading corresponds to the count which has been set-in. The signal Z is then delivered.

The output signal of the time delay stage 9 is fed to the blocking device 11 as well as to the peripheral and comparator logic device 13. In the peripheral and comparator logic 13, this signal triggers the time window for carrying out the desired data comparison.

FIG. 2 shows a third embodiment for a construction of a time window control 17'.

In this embodiment, an unpredictable start of the time delay stage 9 depends on the writing period of a storage cell in the counting memory 4 as follows:

After a free bit is detected in the counting memory 4, the multivibrator 8 is set. A further flip-flop 22 having a Q-output which is fed to the peripheral and comparator logic device 13, is therefore also set through a monoflop 21.

Due to this signal, a writing operation is started in which the writing is placed into the respective free storage cell of the counting memory 4, as already described above.

For writing, the control input of the respective storage cell is acted upon by square-wave pulses from the peripheral and comparator logic device 13. As is shown schematically in FIG. 2, these square-wave pulses are supplied through an AND stage 24 as long as a logical level is present on a line 23 at the second input of the AND stage 24. Every square-wave pulse causes a step-like increase of the threshold voltage of the storage cell. As soon as the threshold voltage reaches a preset reference voltage, the writing operation is terminated. The threshold voltage is always measured during the time between the square-wave pulses. This method of measuring the writing period of a storage cell is described in German Published, Non-Prosecuted Application DE-OS 28 28 855 and corresponding U.S. Pat. No. 4,279,024.

When the writing operation is completed, the input signal of the OR stage 7 changes from a logical 1 to a logical 0. The flip-flop 22 is therefore reset through a reset input R which in turn generates the signal Z through a Q output, and the time delay stage 9 is triggered through the AND stage 16.

At the same time, the AND stage 24 blocks all further square-wave pulses.

Since the storage cells of the counting memory 4 differ with respect to the properties relevant for the write operation within a tolerance spectrum, the writing times are also subject to a spread which cannot be determined in advance. This applies not only to storage cells on one chip but also to storage cells of different chips.

I claim:

1. A method for protecting data stored in a data memory of a data carrier, from analysis which may allow drawing conclusions as to the content of the memory from signals at the outputs of the memory while the data carrier is connected to a peripheral logic device, wherein an identification code is fed into the data carrier to effect data transfer through the outputs of the memory into the peripheral logic device, and wherein the data transfer from the data memory to the peripheral logic device is normally blocked, the method comprising the steps of:

(a) activating a timer after an affirmative result of a checking action has been reached;

(b) releasing the blocking of the data transfer from the memory to said peripheral logic device during a predetermined time window which is adjusted such as to allow only one single comparison action of the stored data;

(c) including in the checking action a check of the entered identification code for correctness; and initiating a start of the time period by the end of writing a storage cell.

2. Method according to claim 1, which comprises designating a writing state of the counting memory as a discharge state of the corresponding storage cells.

3. Method according to claim 1, which comprises jointly addressing an identification memory with the data memory and the counting memory, and blocking the data transfer from the data memory to the peripheral logic in dependence on the storage information in the identification memory.

4. A method for protecting data stored in a data memory of a data carrier, from analysis which may allow drawing conclusions as to the content of the memory from signals at the outputs of the memory while the data carrier is connected to a peripheral logic device, wherein an identification code is fed into the data carrier to effect data transfer through the outputs of the memory into the peripheral logic device, and wherein the data transfer from the data memory to the peripheral logic device is normally blocked, the method comprising the steps of:

(a) activating a timer after an affirmative result of a checking action has been reached;

(b) releasing the blocking of the data transfer from the memory to said peripheral logic device during a predetermined time window which is adjusted such as to allow only one single comparison action of the stored data;

(c) including in the checking action a check of the entered identification code for correctness; and starting a monostable multivibrator at the start of the time period, the monostable multivibrator having a pulse with a trailing edge which determines the end of the time period.

5. A method for protecting data stored in a data memory of a data carrier, from analysis which may allow drawing conclusions as to the content of the memory from signals at the outputs of the memory while the data carrier is connected to a peripheral logic device, wherein an identification code is fed into the data carrier to effect data transfer through the outputs of the memory into the peripheral logic device, and wherein the data transfer from the data memory to the peripheral logic device is normally blocked, the method comprising the steps of:

(a) activating a timer after an affirmative result of a checking action has been reached;

(b) releasing the blocking of the data transfer from the memory to said peripheral logic device during a predetermined time window which is adjusted such as to allow only one single comparison action of the stored data;

(c) including in the checking action a check of the entered identification code for correctness; and adjusting the start of the time period in dependence on a writing period of a storage cell of a counting memory.

6. Integrated circuit for protecting stored code data from analysis, comprising a data memory for storing the stored code data and having outputs, a blocking device connected to said outputs of said data memory, a time delay stage for determining a time window, said time delay stage being connected to said blocking device for addressing said blocking device and being connected to said data memory for triggering said time delay stage, at least indirectly, with an address signal of said data memory, means for generating a predetermined potential, a peripheral logic device, means for connecting said peripheral logic device to said means for generating said predetermined potential, said blocking device including means for disconnecting said means for generating said predetermined potential from said peripheral logic device within said time window and for connecting said outputs of said data memory to said peripheral logic device independently of the content of said data memory outside said time window.

7. Circuit according to claim 6, wherein said time delay stage is a monostable multivibrator.

8. Circuit according to claim 6, wherein said releasing and connecting means are in the form of transistors having controlled paths each being connected to a respective one of said memory outputs to be protected and to said predetermined potential source.

9. Circuit according to claim 6, including a counting memory connected parallel to said data memory for registering the number of addressings of said data memory, and a logic member connected between said counting memory and said time delay stage for indicating a counter overflow.

10. Circuit according to claim 9, including an address counter connected to said counting memory.

11. Circuit according to claim 10, including a multivibrator having a setting input at least indirectly connected to said counting memory, a resetting input connected to said address counter and an output connected to said counting stage.

12. Circuit according to claim 6, including an identification memory connected parallel to said data memory and having an output connected to said blocking device for activating and deactivating said blocking device.

13. Circuit according to claim 6, including an internal time window control connected to an input of said time delay stage.

14. Circuit according to claim 13, wherein said time window control is a random generator.

15. A method for protecting data stored in a data memory of a data carrier which includes a counting memory for counting the number of permissible access attempts, and a time delay stage for providing an unpredictable delay, from analysis which may allow drawing conclusions as to the content of the memory from signals at the outputs of the memory while the data carrier is connected to a peripheral logic device, and wherein an identification code is fed into the data carrier to effect data transfer through the outputs of the memory into the peripheral logic device, and wherein the data transfer from the data memory to the peripheral logic device is normally blocked, the method comprising the steps of:

(a) activating a timer after an affirmative result of a checking action has been reached; and, in response to the delay stage (b) releasing the blocking of the data transfer from the data memory to said peripheral logic device during a predetermined time window which is adjusted such as to allow only one single comparison action of the stored data; and (c) including in the checking action a check of the entered identification code for correctness.

16. Method according to claim 15, which comprises addressing a counting memory registering the addressing with every data address of the data memory.

17. Method according to claim 15, which comprises switching output lines of the data memory to a fixed potential independently of the data memory, for blocking the data transfer from the data memory to the peripheral logic.

18. Method according to claim 15, which comprises determining the start of the time period with a control which is internal to a chip and cannot be recognized from the outside.

19. Method according to claim 18, which comprises determining the start of the time period with a random generator.

* * * * *